US012652727B2

(12) United States Patent
Zhao

(10) Patent No.: US 12,652,727 B2
(45) Date of Patent: Jun. 9, 2026

(54) GRAPHENE HEATER FOR OIL TANK OF OIL FIELD

(71) Applicant: Anping Zhao, Beijing (CN)

(72) Inventor: Anping Zhao, Beijing (CN)

( * ) Notice: Subject to any disclaimer, the term of this patent is extended or adjusted under 35 U.S.C. 154(b) by 761 days.

(21) Appl. No.: 18/001,359

(22) PCT Filed: Jun. 8, 2021

(86) PCT No.: PCT/CN2021/098883
§ 371 (c)(1),
(2) Date: Dec. 9, 2022

(87) PCT Pub. No.: WO2021/249388
PCT Pub. Date: Dec. 16, 2021

(65) Prior Publication Data

US 2023/0247733 A1 Aug. 3, 2023

(30) Foreign Application Priority Data

Jun. 11, 2020 (CN) ........................ 202010532424.8

(51) Int. Cl.
*H05B 3/42* (2006.01)
*B65D 88/74* (2006.01)

(52) U.S. Cl.
CPC ............. *H05B 3/42* (2013.01); *B65D 88/744* (2013.01)

(58) Field of Classification Search
CPC . H05B 3/145; H05B 3/42; H05B 3/82; B65D 88/744
See application file for complete search history.

(56) References Cited

U.S. PATENT DOCUMENTS 10,397,983 B2 8/2019 Fortenbacher et al.
2013/0223825 A1* 8/2013 Jang ........................ F24H 1/121 392/465

FOREIGN PATENT DOCUMENTS

CN 203691669 U 7/2014
CN 205208900 U * 5/2016
CN 109803457 A 5/2019
CN 110242251 A 9/2019

(Continued)

*Primary Examiner* — Thien S Tran
(74) *Attorney, Agent, or Firm* — Thomas Horstemeyer, LLP

(57) ABSTRACT

Disclosed is a graphene heater for an oil tank of an oil field. A heating layer of the heater is a graphene layer (2); a high-temperature-resistant insulating layer (1), an intermediate layer composed of the graphene layer (2) and electrode layers (3), and a high-temperature-resistant insulating layer (1) are tightly attached together in sequence and then attached to an inner wall of a housing (5); the housing (5) is columnar; one end of the housing (5) mounted in the oil tank is closed; the other end of the housing is fixed on a surface of the oil tank by means of a flange plate (4); the flange plate (4) of the housing (5) is partially connected to a junction box (8); and when the electrode layers (3) at two ends of the graphene layer (2) are powered on, under the action of an electric field, heat energy generated by severe friction and impact between carbon atoms of graphene is radiated by means of far infrared ray with a wavelength of 5 to 14 microns, so that heat is effectively provided, so as to realize heating, heat preservation and freezing prevention of the oil tank of the oil field.

4 Claims, 3 Drawing Sheets

(56) References Cited

FOREIGN PATENT DOCUMENTS

| | | | | |
|---|---|---|---|---|
| CN | 110680599 | A | | 1/2020 |
| CN | 210772734 | U | * | 6/2020 |
| CN | 212435965 | U | * | 1/2021 |
| CN | 112607236 | A | | 4/2021 |

* cited by examiner

Direction A

GRAPHENE HEATER FOR OIL TANK OF OIL FIELD

CROSS-REFERENCE TO RELATED APPLICATION

This patent application claims the benefit and priority of Chinese Patent Application No. 202010532424.8, filed with the China National Intellectual Property Administration on Jun. 11, 2020, the disclosure of which is incorporated by reference herein in its entirety as part of the present application.

TECHNICAL FIELD

The present disclosure relates to a heating device of an oil tank of an oil field, in particular to a graphene heater for an oil tank of an oil field, which saves energy, is convenient to mount and remove, and can effectively heat the oil tank of the oil field to prevent crude oil in the tank from being frozen and solidified.

BACKGROUND

At present, the well-known method for preventing the freezing and solidification of an oil tank of an oil field is to use a plug-in electric heating rod to heat crude oil in the oil tank of the oil field. The plug-in electric heating rod is mounted in an oil tank cavity, and is provided with an electric heating alloy serving as a heating element. Since the plug-in electric heating rod generates heat using the resistance heating principle, the heating efficiency is low, and high energy consumption will be caused. Therefore, extremely high production cost can be generated.

After review of relevant data at home and abroad, it was found that most of relevant heating equipment and technologies for preventing the freezing and solidification of oil tanks of oil field achieves heating according to the resistance heating principle, such as plug-in electric heating rod equipment being used on a large scale, causing a great waste of energy. In addition, there are also methods for providing heat energy by fossil fuel combustion, such as steam pipe coil heating and hot water pipe coil heating. These solutions are rarely used because of the complexity and low heating efficiency.

SUMMARY

In order to overcome the shortcoming of a severe waste of energy caused by low heating energy when plug-in heating equipment based on the resistance heating principle solve freezing and solidification of an oil tank of an oil field, the present disclosure provides a graphene heater for an oil tank of an oil field, which takes graphene as a heating source. The problems of freezing and solidification of the oil tank of the oil field are solved on the basis of the principle that graphene generates far infrared radiation under the action of an electric field.

The technical solution of the present invention is to provide a graphene heater for an oil tank of an oil field, including a flange plate, a housing, a high-temperature-resistant insulating layer, a heating layer and electrode layers, and a high-temperature-resistant wire; one end of a cylindrical housing is sealed, and the other end of the housing is fixed on a surface of the oil tank by the flange plate; the flange plate of the housing is partially connected with a junction box; the high-temperature-resistant insulating layer, the graphene layer and the electrode layers, and the high-temperature-resistant wire are all mounted in the housing; the high-temperature-resistant insulating layer, the graphene layer and electrode layers, and the high-temperature-resistant layer are attached together in sequence and are then attached to an inner wall of the housing; one side of a high-temperature-resistant insulating sheet having the same cross-sectional shape as that of an inner cavity of the housing is clung to an inner surface of the closed end of the housing and covers the entire inner surface of the closed end of the housing; and at both ends, planes, perpendicular to an axis of the housing, of a perforated high-temperature-resistant insulating sheet and the high-temperature-resistant insulating sheet having the same cross-sectional shape as that of the inner cavity of the housing are clung to end faces, perpendicular to the axis of the housing, of a portion composed of attaching the high-temperature-resistant insulating layer, the graphene layer and the electrode layers, and the high-temperature-resistant insulating layer in sequence, thus forming insulated isolation; when the electrode layers at the two ends of the graphene layer are powered on, under the action of an electric field, heat energy generated by severe friction and impact between carbon atoms of graphene is uniformly radiated in the form of a plan by means of far infrared ray with a wavelength of 5 to 14 microns, so that heat is uniformly provided, and a temperature controller can be used to control a temperature; the total conversion rate of effective electric heating energy is 99% or above; the demands for heating and thermal insulation of the oil tank of the oil field are effectively met; and the effect of saving energy is achieved.

The patent of the present disclosure has the advantages that by the adoption of the heating principle that graphene generates far infrared radiation under the action of the electric field and a mounting method for plugging an oil tank, the demands for heating and thermal insulation of the oil tank of the oil field are effectively met; the energy is saved; the mounting and removal are convenient; and the maintenance cost is low.

Figure 1:
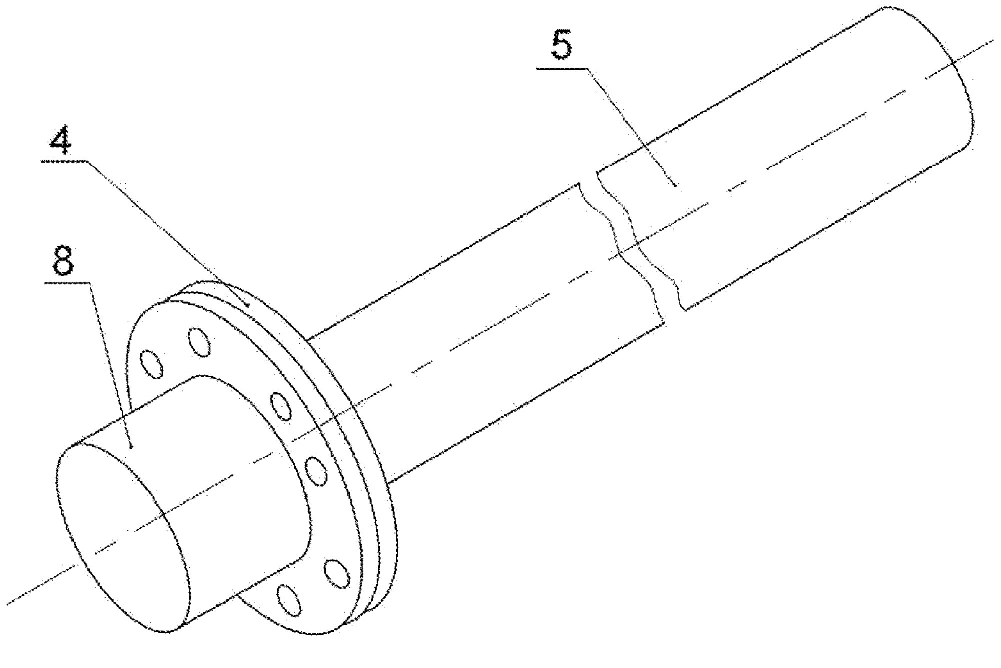
FIG. 1 is a three-dimensional diagram of an embodiment of the present disclosure, in which a fastener for fixing a flange plate, and a sealing washer are omitted.

In the drawings: 1: high-temperature-resistant insulating layer; 2: graphene layer; 3: electrode layer; 4: flange plate; 5: housing; 6: high-temperature-resistant wire; 7: temperature sensing probe; 8: junction box; 9: wire outlet hole; 10: sealing washer; 11: high-temperature-resistant insulating sheet; 12: perforated high-temperature-resistant insulating sheet; 13: oil tank; 14: support; 15: wire; 16: temperature sensing probe connection wire; 17: explosion-proof wire connector; 18: explosion-proof temperature controller; 19: power supply; and 20: graphene heater for an oil tank of the oil field.

DETAILED DESCRIPTION OF THE EMBODIMENTS

The present disclosure is described in detail in combination with the accompanying drawings and embodiments of this specification.

Embodiment

As shown in FIG. 1, a housing (5) of a graphene heater for an oil tank of an oil field is cylindrical, and a flange plate (4) of the housing (5) is partially connected with a junction box (8).

Figure 2:
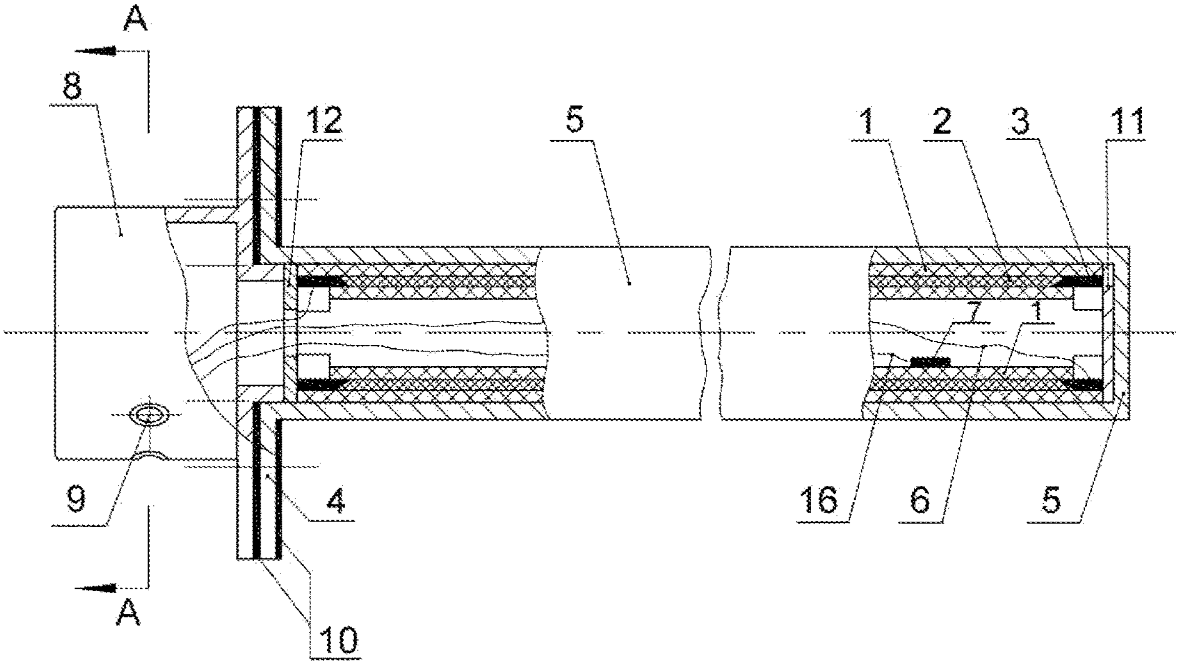
FIG. 2 is a schematic diagram of a relative position between materials that constitute a graphene heater for an oil tank of an oil field and a sealed end of a housing in an embodiment of the present disclosure, in which a fastener for fixing a flange plate, and a temperature sensing probe connection wire and high-temperature-resistant wires led from wire outlet holes are omitted.

As shown in FIG. 2, one end of the housing (5) of the graphene heater for an oil tank of an oil field plugged in an oil tank (13) is closed; the other end of the housing (5) is used for fixing the graphene heater for an oil tank of an oil field on a flange plate (4) on a surface of the oil tank (13); the flange plate (4) is connected to the junction box (8); a high-temperature-resistant insulating layer (1), a graphene layer (2) and electrode layers (3), and a high-temperature-resistant insulating layer (1) of the graphene heater for an oil tank of an oil field are attached together in sequence, and are then attached to an inner wall of the housing (5); one side of a high-temperature-resistant insulating sheet (11) having the same cross-sectional shape as that of an inner cavity of the housing (5) is clung to an inner surface of the closed end of the housing (5) and covers the entire inner surface of the closed end of the housing (5); and at both ends, planes, perpendicular to an axis of the housing (5), of a perforated high-temperature-resistant insulating sheet (12) and the high-temperature-resistant insulating sheet (11) having the same cross-sectional shape as that of the inner cavity of the housing (5) are clung to end faces, perpendicular to the axis of the housing (5), of a portion composed of attaching the high-temperature-resistant insulating layer (1), the graphene layer (2) and the electrode layers (3), and the high-temperature-resistant insulating layer (1) in sequence, thus forming insulated isolation; a temperature sensing probe connection wire (16) connected with a temperature sensing probe (7) and high-temperature-resistant wires (6) respectively connected with the electrode layers (3) at the two ends of the graphene layer (2) are respectively led to the junction box (8) and are then led out from three wire outlet holes (9) of the junction box (8) (in the figure, the temperature sensing probe connection wire (16) and the high-temperature-resistant wires (6) led from the wire outlet holes are omitted); a sealing washer (10) prevents crude oil in the oil tank from leaking when a fastener for the flange plate of the graphene heater for an oil tank of an oil field is mounted and fixed on a surface of the oil tank.

Figure 3:
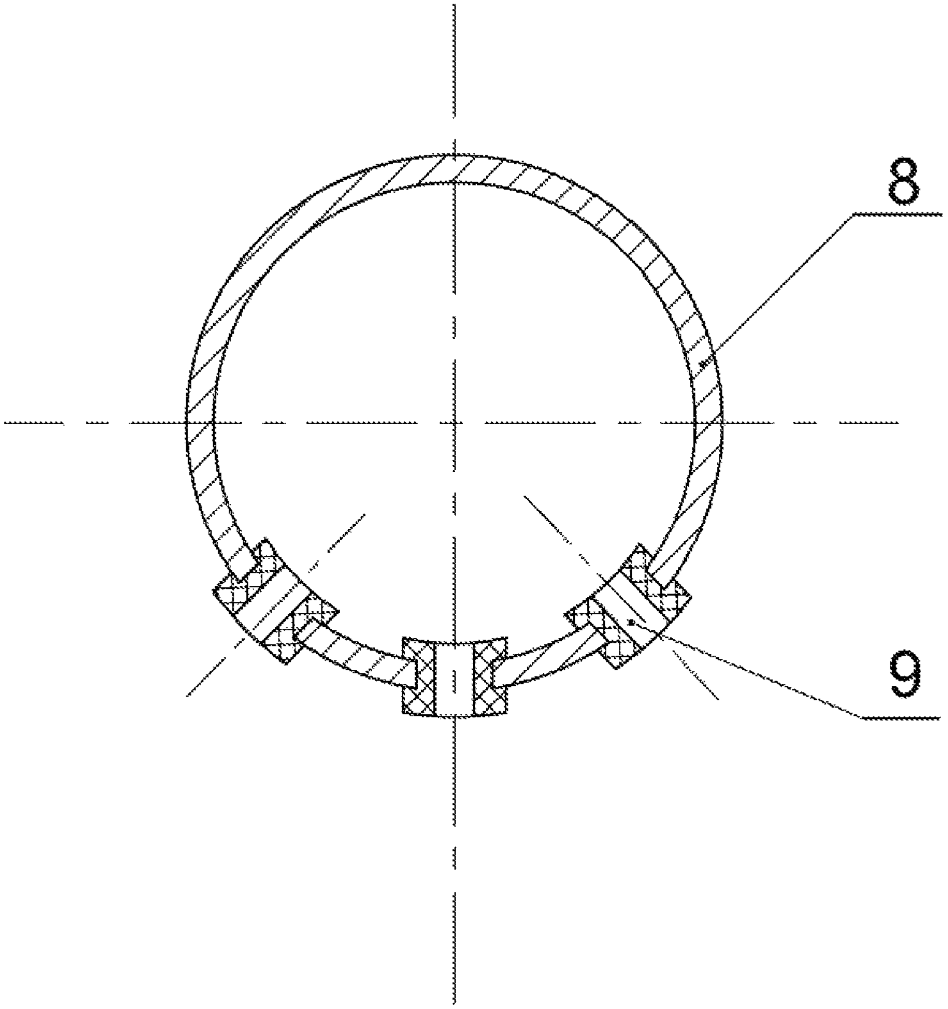
FIG. 3 is a schematic diagram of wire outlet holes on a junction box in an embodiment of the present disclosure.

As shown in FIG. 3, a structure of the junction box (8) provided with three wire outlet holes (9).

Figure 4:
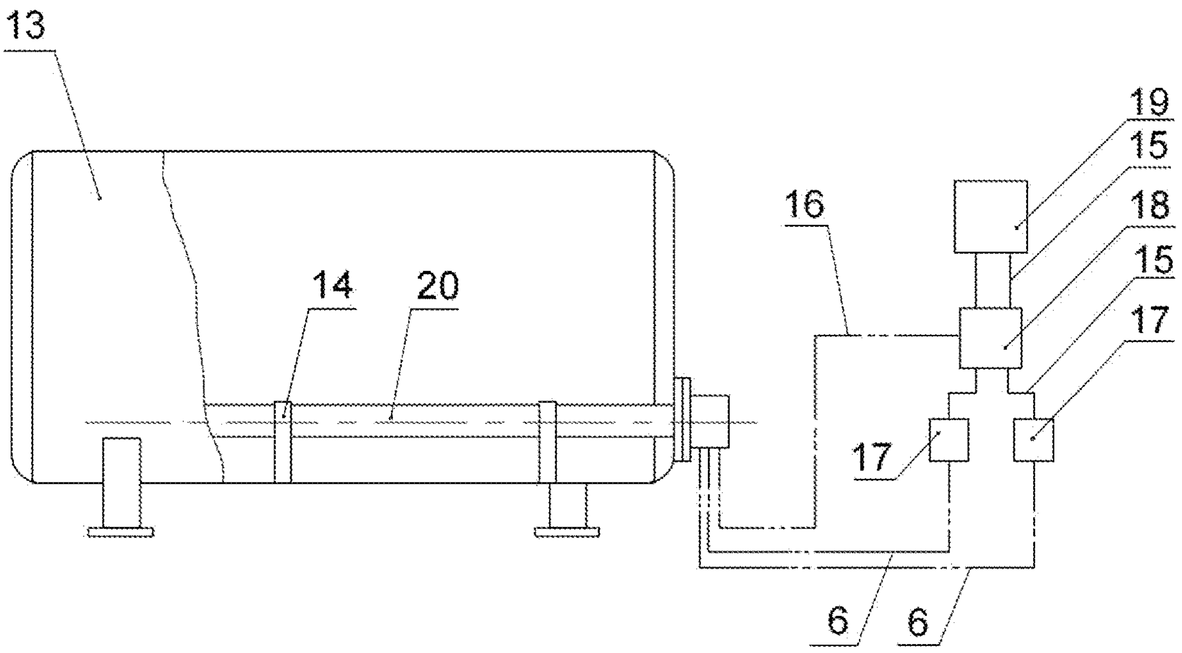
FIG. 4 is a schematic diagram of a state of mounting a graphene heater for an oil tank of an oil field in an oil tank and a working principle, in which other structures of the oil tank, crude oil in the oil tank and a fastener for mounting a flange plate of the graphene heater for an oil tank of an oil field.

As shown in FIG. 4, the graphene heater (20) of an oil tank of the oil field is mounted on a support (14) at an inner bottom of a cavity of the oil tank (13); one end of the graphene heater (20) of an oil tank of the oil field is fixed on a surface of the oil tank (13) by the flange plate (4) and a fastener; the temperature sensing probe connection wire (16) led from a temperature sensing probe (7) is connected to an explosion-proof temperature controller (18); the high-temperature-resistant wires (6) led from the electrode layers (3) at the two ends of the graphene layer (2) are respectively connected to explosion-proof wire connectors (17); wires (15) led from the explosion-proof wire connectors (17) are connected to a temperature controller (18); and the wires (15) led from the temperature controller (18) are connected to a power supply (19).

When the electrode layers (3) at the two ends of the graphene layer (2) are connected to the power supply (19), under the action of an electric field, heat energy continuously generated by severe friction and impact between carbon atoms of the graphene layer (2) is uniformly radiated in the form of a plane by means of far infrared ray with a wavelength of 5 to 14 microns, so that heat is directly transferred to an inner surface of the housing (5) of the graphene heater for an oil tank of an oil field, and the temperature of the housing (5) of the graphene heater for an oil tank of an oil field continuously rises from inside to outside; and the housing (5) of the graphene heater for an oil tank of an oil field continuously transfers the heat to the crude oil in the oil tank. The temperature sensing probe (7) continuously transfers the temperature of the inner surface of the high-temperature-resistant insulating layer (1) of the graphene heater for an oil tank of an oil field to the explosion-proof temperature controller (18) through the temperature sensing probe connection wires (16). When the temperature of the inner surface of the high-temperature-resistant insulating layer (1) of the graphene heater for an oil tank of an oil field reaches a temperature preset by the explosion-proof temperature controller (18), the explosion-proof temperature controller (18) automatically switches off circuits of the electrode layers (3). At this time, the graphene layer (2) stops radiating the far infrared ray, and the temperature of the outer surface of the housing (5) of the graphene heater for an oil tank of an oil field starts to decrease. When the explosion-proof temperature controller (18) detects through the temperature sensing probe (7) that the temperature of the inner surface of the high-temperature-resistant insulating layer (1) of the graphene heater for an oil tank of an oil field is less than the temperature preset by the explosion-proof temperature controller (18), the explosion-proof temperature controller (18) automatically switches on the circuits of the electrode layers (3). Under the action of the electric field, the graphene layer (2) starts to radiate far infrared ray again to heat the housing (5) of the graphene heater for an oil tank of an oil field. The above processes are repeated to achieve continuous work, which effectively meets the demands for heating and thermal insulation of the oil tank of the oil field and achieves the effect of saving energy.

What is claimed is:

1. A graphene heater for an oil tank of an oil field, comprising:

a cylindrical housing, wherein one end of the housing is closed and is plugged into the oil tank, and an other end of the housing is provided with a flange plate and is fixed on a surface of the oil tank;

an attachment structure attached to an inner wall of the housing, wherein the attachment structure comprises a first high-temperature-resistant insulating layer, an intermediate layer and a second high-temperature-resistant insulating layer which are attached and connected in sequence; the intermediate layer comprises a graphene layer and electrode layers located at two ends of the graphene layer; the electrode layers are connected with high-temperature-resistant wires;

a high-temperature-resistant insulating sheet having a same cross-sectional shape as that of an inner cavity of the housing, wherein the high-temperature-resistant insulating sheet is clung to and covers an entire inner surface of the closed end of the housing;

a perforated high-temperature-resistant insulating sheet having the same cross-sectional shape as that of the inner cavity of the housing; and a junction box connected with the flange plate;

wherein the perforated high-temperature-resistant insulating sheet and the high-temperature-resistant insulating sheet are respectively clung to two end faces of the attachment structure; and the end faces are perpendicular to an axis of the housing.

2. The graphene heater for the oil tank of the oil field according to claim 1, further comprising a temperature sensing probe, wherein the temperature sensing probe is used for detecting a temperature of an inner surface of the first high-temperature-resistant insulating layer or the second high-temperature-resistant insulating layer; and the temperature sensing probe is connected with a temperature sensing probe connection wire.

3. The graphene heater for the oil tank of the oil field according to claim 2, further comprising an explosion-proof temperature controller, explosion-proof wire connectors and a power supply, wherein the temperature sensing probe is connected to the explosion-proof temperature controller; the high-temperature-resistant wire is connected to the explosion-proof wire connector; wires led from the explosion-proof wire connectors are connected to the explosion-proof temperature controller; and the wires led from the explosion-proof temperature controller is connected to the power supply.

4. The graphene heater for the oil tank of the oil field according to claim 1, wherein one end of the junction box is a barrel-shaped portion; the barrel-shaped portion is plugged into the housing; and a cross section of an outer diameter of the barrel-shaped portion has a same shape as that of the cross section of the inner cavity of the housing.

* * * * *